Aug. 23, 1955 A. J. DERR 2,715,851
REFLECTANCE ACCESSORY FOR A SPECTROPHOTOMETER TO EVALUATE THE FLUORESCENT CHARACTERISTICS OF OPAQUE MATERIALS
Filed Aug. 4, 1952 2 Sheets-Sheet 1
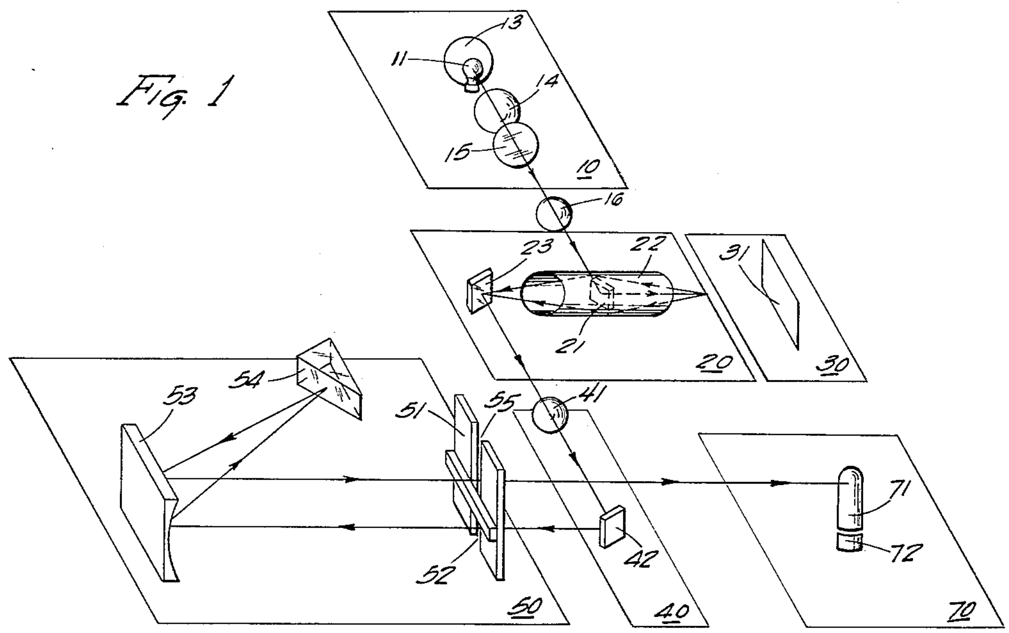
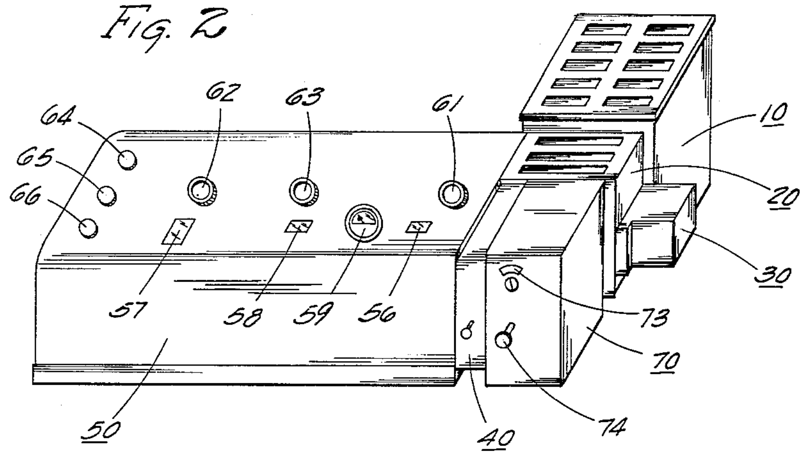
INVENTOR.
ALBERT J. DERR
BY H. H. Schmitt
H. H. Gezepugan
ATTORNEYS Aug. 23, 1955 A. J. DERR 2,715,851
REFLECTANCE ACCESSORY FOR A SPECTROPHOTOMETER TO EVALUATE THE FLUORESCENT CHARACTERISTICS OF OPAQUE MATERIALS
Filed Aug. 4, 1952 2 Sheets-Sheet 2
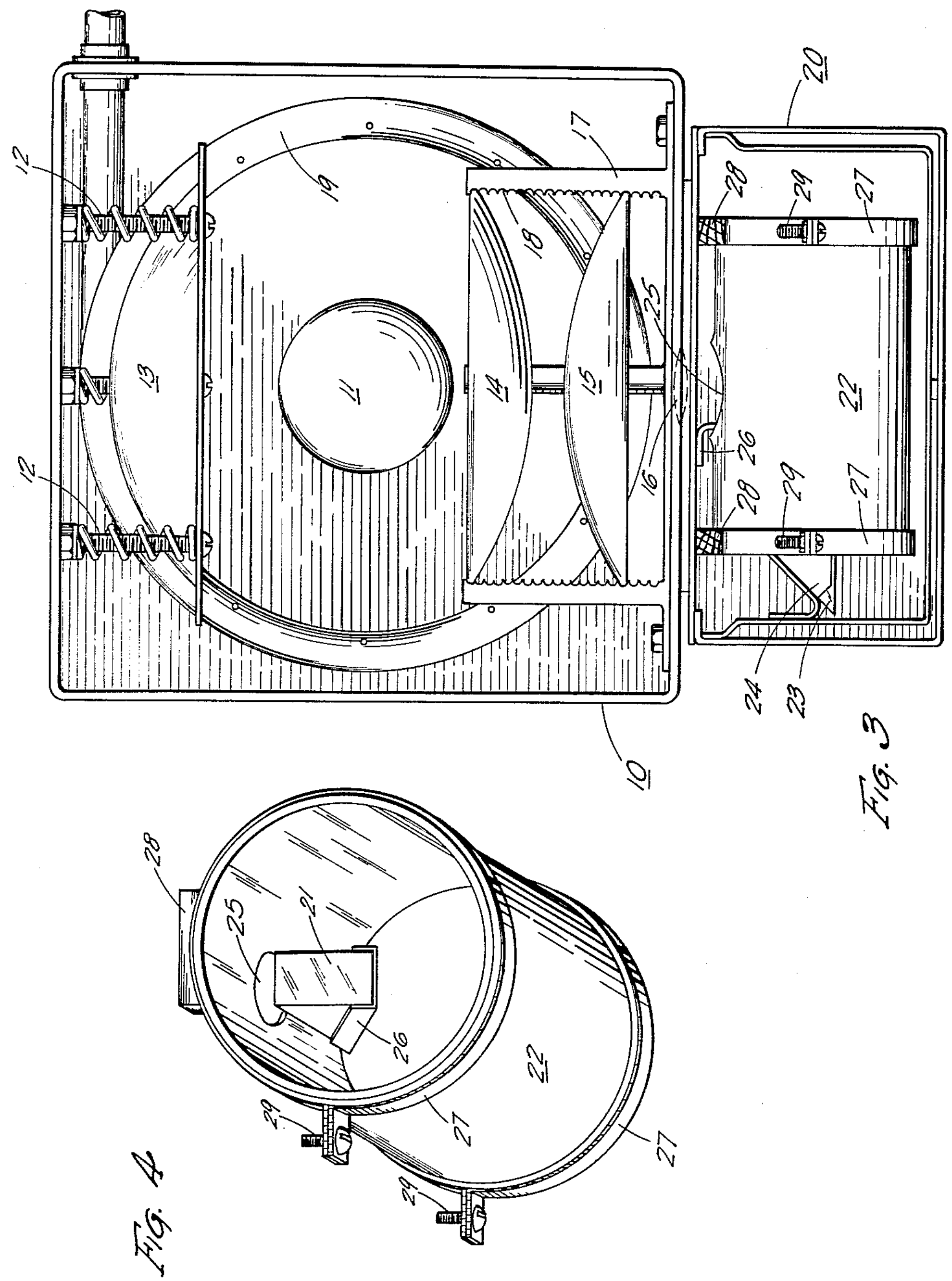
INVENTOR.
ALBERT J. DERR
BY
ATTORNEYS United States Patent Office 2,715,851 Patented Aug. 23, 1955

2,715,851

REFLECTANCE ACCESSORY FOR A SPECTROPHOTOMETER TO EVALUATE THE FLUORESCENT CHARACTERISTICS OF OPAQUE MATERIALS

Albert Joseph Derr, Binghamton, N. Y.

Application August 4, 1952, Serial No. 302,638

2 Claims. (Cl. 88—14)

(Granted under Title 35, U. S. Code (1952), sec. 266)

The invention described herein may be manufactured and used by or for the Government of the United States of America for governmental purposes without the payment of any royalties thereon or therefor.

This invention relates to new and useful improvements in spectrophotometers for testing samples of opaque fluorescent materials to determine their spectral characteristics.

The invention contemplates the modification of a spectrophotometer and its use in a manner which renders the device efficient in evaluating the fluorescent characteristics of opaque materials.

In developing dyes for materials and in testing materials to determine their spectral characteristics it is common practice to employ a spectrophotometer to measure the energy reflected by the sample at various points along the color spectrum in order that the color characteristics desired in the material may be obtained.

Prior to this invention the tests were accomplished by separating the energy from a standard light source into component colors and causing a selected monochromatic beam to fall upon the sample to be tested. The energy reflected from the sample was then directed to a photocell and an indication of the quantum of energy reflected obtained from an appropriately connected meter and compared with the indication given when a standard material was inserted in place of the sample. When the sample tested had fluorescent characteristics, the indication obtained by this method did not truly represent the reflectance characteristics of the sample as they would appear when the sample was exposed to normal viewing light since it did not account for energy of the wave length being observed which would result from fluorescence of the sample caused by incident light of wave lengths other than that of the monochromatic beam.

The present invention solves this problem by illuminating the sample with a light source which provides light containing frequencies over the entire color spectrum and then separating the energy reflected from the sample into its component colors. The desired monochromatic beam is then selected and the energy at that wave length measured. In this manner, energy of the wave length of the selected monochromatic beam which is caused to fluoresce from the sample by incident light of other wave lengths is also accounted for. The indications obtained, therefore, closely approximate the true color characteristics of the sample under normal viewing conditions.

It is an object of this invention to teach a new method for measuring color characteristics of fluorescent samples which method will eliminate the error introduced by the old method described above.

It is another object of this invention to provide apparatus in the form of an accessory for existing spectrophotometers by which the new method may be carried out.

A further object of the present invention is to disclose apparatus by which the sample to be tested may be illuminated with light containing energy of wave lengths over the color spectrum from violet to red.

Other objects and many of the attendant advantages of this invention will be readily appreciated as the same becomes better understood by reference to the following detailed description when considered in connection with the accompanying drawings wherein:

Fig. 1 is a schematic diagram of the apparatus drawn in perspective;

Fig. 2 is a perspective view of the apparatus in its case;

Fig. 3 is a top plan view of the light source, collimators and cylindrical mirror drawn in an enlarged scale; and Fig. 4 is an enlarged perspective view of the cylindrical mirror and one of the reflectors used in the improved apparatus.

As shown in Fig. 1 of the drawing the illuminating section 10 of the housing contains a 500 watt projection bulb 11. This corresponds to ICI (International Committee on Illumination) illuminant "A." A reflector 13 is arranged behind the bulb and condensers 14 and 15 are mounted as shown in Fig. 3. Reflector 13 may be focused by adjustment of the screw and spring assembly 12. Liquid filters may be inserted between the condensers 14 and 15 to convert the light to ICI illuminant "B" or "C" or other standards. A support 17 having serrations 18 provides for adjustment of the condensers and for insertion of filters if they are used. The reference character 19 identifies a coil carrying cooling air into the lamp housing. The lens 16 focuses the light through the opening 25 and onto the reflector 21, which may be either a mirror or a prism supported in section 20 of the apparatus housing by a holder or bracket 26. The light is directed by the reflector 21 into the sample holder 30 and impinges upon the sample 31.

The diffusedly reflected light from the sample is directed by a cylindrical mirror 22 to reflector 23 and then through the lens 41 to mirror 42. The cylindrical mirror is attached by straps 27 and bolt and nut assemblies 29 to wooden blocks 28 which are secured in turn to the apparatus housing for section 20. Another holder or bracket 24 supports the reflector 23. A convex mirror may be used for the reflector 23, in which event the lens 41 can be eliminated. The light passes into the monochromating section 50 of the device through entrance slit 52 in gate 51 and to the mirror 53 from whence it is reflected to the prism 54. The light is dispersed into the spectrum of pure colors by the prism 54 and is then reflected from mirror 53 through exit slit 55 and onto the photoelectric cell 71 mounted on base 72 in section 70 of the apparatus.

The desired monochromatic beam is selected by setting the slit width to the proper reading on scale 56 by means of control 61 and rotating the prism 54, as required, by means of the wave length control 62. Wave length is read on scale 57. Shutter switch 73 controls the entrance of light into the photo tube section and lever 74 selects the photoelectric cell required for the wave length being observed. Meter 59 is balanced at center scale by rotation of transmission density control 63 which has an associated scale 58 that indicates the relative amount of energy reaching the photoelectric cell 71. Switch 65 selects the scale multiplier, control 66 is used to balance the meter at center scale with the shutter switch 73 in "off" position, that is, with no light reaching the phototube, and the sensitivity control 64 is used to balance the meter with the transmission density control arbitrarily set to give a 100% reading on its associated scale when the reflecting standard is substituted for the sample.

Sections 30, 50 and 70 of the device are standard parts of a conventional spectrophotometer and reflectance accessory furnished therewith.

In the use of this device, control 66 is used to balance the meter at center scale with the light source on, the proper photocell in position and the shutter switch 73 "off." The desired slit width and wave length settings are made and the reflecting standard placed in the sample holder. The control 63 is set to give an arbitrary reading of 100% on scale 58 and the shutter switch turned to the "on" position. Meter 59 is made to read center scale by manipulation of sensitivity control 64. The sample to be tested is then substituted for the standard and the percent reflectance read from the scale 58 after meter 59 has been balanced at center scale by manipulation of the control 63.

By following this procedure for each wave length from violet to red, the reflectance characteristics of the sample over the color spectrum may be accurately obtained.

Obviously many modifications and variations of the present invention are possible in the light of the above teachings. It is, therefore, to be understood that within the scope of the appended claims the invention may be practiced otherwise than as specifically described.

What is claimed is:

1. In a spectrophotometric device having a monochromating section, a reflectance accessory which comprises a first housing containing a light source, a second housing secured to the first housing and containing a reflector for directing the light toward a sample, a sample holder adjacent said second housing for supporting the material being tested, a cylindrical mirror and a reflector also in said second housing acting to direct the energy reflected from the sample to the monochromating section of the device.

2. A spectrophotometric device having a monochromating section, a reflectance accessory attached to said device, the accessory comprising a first housing containing a light source, an aperture in said first housing, a second housing attached to said first housing and having a mating aperture through which light is directed from said first housing, a sample holder secured to said second housing for supporting a sample, a first reflector in said second housing arranged to cause light from said light source to impinge on the sample, a second reflector lying on the side of said first reflector opposite the sample and a cylindrical mirror surrounding said first reflector for collecting the light reflected from the sample and directing it to said second reflector which in turn directs the light to the monochromating section of the device.

References Cited in the file of this patent

UNITED STATES PATENTS

| | | |
|---|---|---|
| 297,851 | Roche | Apr. 29, 1884 |
| 1,153,161 | Hill | Sept. 7, 1915 |
| 1,351,562 | Foster | Apr. 31, 1920 |
| 1,835,176 | Oberg et al. | Dec. 8, 1931 |
| 1,880,414 | Capstaff | Oct. 4, 1932 |
| 1,981,999 | French | Nov. 27, 1934 |
| 2,052,404 | Kearsley | Aug. 25, 1936 |
| 2,240,722 | Snow | May 6, 1941 |
| 2,620,445 | Tyler | Dec. 2, 1952 |

OTHER REFERENCES

Studer, F. J., "Method for Automatically Plotting Spectral Energy Distribution of Luminescent Materials." Journal of the Optical Society of America, vol. 38, May 1948, pages 467 through 470.